Patented July 22, 1941

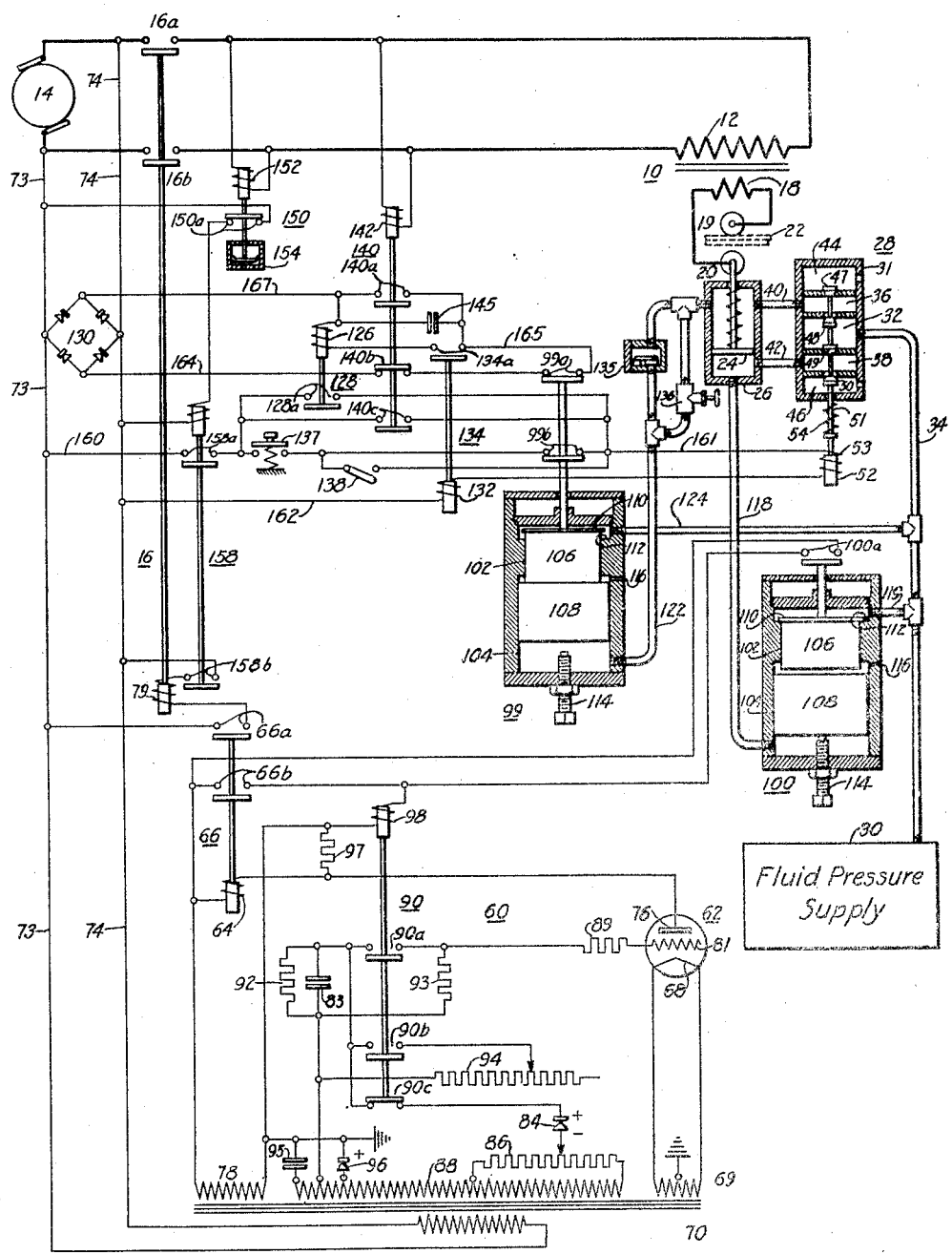

2,249,869

UNITED STATES PATENT OFFICE 2,249,869

WELDING APPARATUS

Colby W. Steward, West Springfield, Mass., assignor to Westinghouse Electric & Manufacturing Company, East Pittsburgh, Pa., a corporation of Pennsylvania Application January 4, 1939, Serial No. 249,188

9 Claims. (Cl. 219—4)

My invention relates, generally, to welding apparatus, and it has particular reference to a control system for fluid pressure operated welding apparatus.

In general, it is an object of my invention to provide for controlling in a simple and efficient manner the sequence of operations in fluid pressure operated welding apparatus.

More specifically it is an object of my invention to control automatically the sequence of the application of electrode pressure and the energization of the welding circuit in fluid pressure actuated seam or spot welding apparatus, so as to prevent energization of the welding circuit unless a predetermined differential of fluid pressure exists between particular points in the fluid pressure system.

Another object of my invention is to provide fluid pressure actuated relay means, responsive to a differential in pressure between two points in the fluid pressure system, for effecting the energization and deenergization of the welding circuit in fluid pressure actuated welding apparatus in accordance with the application of fluid pressure to, and its removal from the electrode actuating means.

A further object of my invention is to provide for coordinating the connection of the welding electrodes to a source of welding current with the application of fluid pressure thereto, in fluid pressure actuated welding apparatus, so as to provide for single or repeated operations thereof, prevent energization of the electrodes before the proper electrode pressure has been applied, and prevent accidental reduction of the electrode pressure before the disconnection of the welding electrodes from the source.

Other objects will, in part, be obvious and will, in part, appear hereinafter.

In practicing a preferred embodiment of my invention, the energization of the welding electrodes of fluid pressure operated spot or seam welding apparatus from a source of power may be controlled by providing differential fluid pressure relays connected between the source of fluid pressure and the cylinder of the fluid pressure electrode actuating means. By suitably designing the differential pressure relays so that they operate only upon the existence of a predetermined differential in pressure between the fluid pressure source and the cylinder of the electrode actuating means, suitable timing means may be energized thereby in accordance with a predetermined condition of electrode pressure to effect the connection of the electrodes to the source of power for a predetermined interval of time. In this manner the sequence of welding operations may be readily controlled, energization of the electrodes being prevented until a suitable condition of electrode pressure is first attained, and their deenergization being effected prior to the reduction of such pressure. By suitably controlling the rate of flow of fluid pressure between the cylinder of the electrode actuating means and one of the differential pressure relays through the use of suitable valve means, and connecting the relay to control the application of fluid pressure to the electrode actuating means, successive applications of fluid pressure thereto can be prevented until the differential between the fluid pressures applied to the relay has reached the predetermined operating value, so that the period of deenergization of the welding electrodes between repeated operations may be effectively controlled, thus preventing successive energizations of the welding electrodes before the lapse of a suitable predetermined interval of time. This feature is often desirable in connection with high speed welding operations so as to permit the proper feeding of the work being welded, between successive welding operations.

For a more complete understanding of the nature and scope of my invention reference may be had to the following detailed description, taken in connection with the accompanying drawing, in which the single figure represents diagrammatically a fluid pressure operated welding system embodying a preferred form of my invention.

The reference numeral 10 in the single figure of the drawing denotes generally a transformer having a primary winding 12 connected to a suitable source of alternating-current power 14 through the contact members 16a and 16b of a line switch 16, and a secondary winding 18, connected to a welding circuit comprising, for example, relatively movable electrodes 19 and 20 of a welding machine for performing a welding operation on work 22, which may be positioned therebetween.

The electrode 20 may be supported in any well-known manner so as to be movable relative to the electrode 19, being for example, operatively connected to fluid pressure actuating means such as the piston 24, which is slidably positioned within a cylinder 26. In order to suitably control the movement of the electrode 20, a reversible fluid pressure valve 28 may be provided for controlling the connection of the cylinder 26 to a suitable source of fluid pressure 30, As illustrated, the valve 28 may comprise a casing 31 having a supply chamber 32 connected to the source of fluid pressure by means of a conduit 34, associated inlet chambers 36 and 38 positioned on each side of the supply chamber 32 and connected to the cylinder 26 at the opposite ends thereof by conduits 40 and 42, respectively, for admitting fluid pressure to the cylinder 26 on either side of the piston 24, and exhaust chambers 44 and 46 for connecting the conduits 40 and 42, respectively, to the atmosphere to effect the removal of the fluid pressure from either side of the piston 24. A plurality of valve members 47, 48, 49 and 50, for controlling the application of fluid pressure to the fluid pressure actuating cylinder 26 from the source 30, may be positioned on a movable stem 51 having an operatively connected armature 52 which is actuated by the energization of an associated operating winding 53, and which is normally retained in the position shown by means such as the spring 54.

Any suitable timing means such, for example, as indicated generally by the reference numeral 60, may be provided for controlling the operation of the line switch 16, so as to control the energization and deenergization of the electrodes 19 and 20. The timing means 60 may comprise a grid controlled gaseous discharge device 62, disposed to be rendered conductive for effecting the energization of the operating winding 64 of an auxiliary switch 66, which controls the operation of the line switch 16. The cathode or filament 68 of the gaseous discharge device 62 is preferably connected for energization to a portion 69 of the secondary winding of a control transfer 70, the primary winding 72 of which may be connected to the source 14 by conductors 73 and 74. By connecting the operating winding 64 of the auxiliary switch 66 in series circuit relation with the anode 76 of the gaseous discharge device, an additional portion 78 of the control transformer secondary winding, and the cathode 68, operation of the auxiliary switch 66 may be effected when the gaseous discharge device 62 is rendered conductive, thus connecting the operating winding 79 of the line switch 16 to the source.

The conductivity of the gaseous discharge device 62 may be controlled, in a manner well known in the art, by controlling the polarity of the grid 81 thereof. A condenser 83 may be normally connected in series circuit relation with a unidirectional current device, such as the copperoxide disc rectifier 84, and a variable control resistor 86 to a portion 88 of the control transformer secondary winding, so it may be charged to any suitable potential. By subsequently effecting its connection in series circuit relation with a current limiting resistor 89 to the grid 81 of the gaseous discharge device 62 by a grid control relay 90, a suitable positive bias potential may be impressed upon the grid 81 to render the gaseous discharge device 62 conductive. A shunt connected resistor 92 may be provided for ensuring discharge of the condenser 83 when welding operations are finished. Discharge resistors 93 and 94, disposed to be connected in shunt with the condenser 83 upon operation of the grid control relay 90 may be utilized for controlling the rate of discharge of the condenser 83, thus controlling the period of conductivity of the gaseous discharge device 62, and the duration of the welding period. A condenser 95, connected in series circuit relation with a rectifier device 96 across a portion of the transformer winding 88, may be provided for ensuring a sharp cut-off of the gaseous discharge device 62 when the bias potential of the condenser 83 reaches a predetermined minimum value, by impressing a negative bias voltage thereon. A control resistor 97 of suitable value may be connected between the anode 76 and the grounded side of the transformer winding 78 for applying an alternating current ripple voltage to the operating winding 98 of the grid relay 90 to prevent any tendency of the relay to "seal in" when the current passed by the gaseous discharge device 62 has reached a predetermined minimum value.

In order to control the sequence of the application of electrode pressure to the work 22 and the energization of the welding circuit, differential fluid pressure relays 99 and 100 may be provided. These relays are disposed to be connected, respectively, between the source of fluid pressure 30 and the ends of the cylinder 26 of the fluid pressure actuating means. The relays may be of any suitable construction so as to operate in response to predetermined differences in fluid pressure between the source 30 and the respective ends of the cylinder 26, and may, for example, comprise a pair of cylinders having operatively connected piston members positioned therein, which are disposed to be actuated by fluid pressure. In a preferred form such relays may comprise a single cylinder with stepped bore portions 102 and 104, having diameters of a predetermined ratio and having piston members 106 and 108 slidably disposed in the respective stepped bore portions thereof. As shown, the piston 106, which is positioned in the upper bore portion 102 of the cylinder, may be provided with a flange 110 about the upper edge thereof disposed to seat upon the offset rim portion 112 of the upper cylinder wall when the piston is in deenergized position, and extend down into the enlarged lower bore portion 104. Piston 108 may be adjustably positioned in the lower bore portion 104 of the relay by an adjusting screw 114, so as to provide a clearance between the two pistons when they are in the deenergized position. A breather port 116 may be provided in the wall of the relay for permitting the ready entrance of air to the clearance space between the pistons, to prevent the formation of an air pocket between the pistons, so that when a suitable differential in fluid pressure exists between the fluid pressures applied to the upper and lower bore portions, the lower piston member 108 will be urged against the upper piston 106 to effect the movement thereof. By providing the flange 110 on the piston 106, the effective upper surface of the piston 106 is reduced immediately upon actuation of the piston, giving a "snap" action to the movement thereof when the difference between the fluid pressure in the upper and lower bore portions of the cylinder reaches a predetermined minimum value.

The lower bore portion 104 of the differential pressure relay 100 may be connected to the lower end of the cylinder 26 of the electrode fluid pressure actuating means by a suitable conduit 118, and the upper bore portion 102 of said relay may be connected to the fluid pressure source 30 by a conduit 119. Contact members 100a may be operatively connected by the piston 106 of the relay 100 for connecting the operating winding 98 of the grid control relay 90 across the portion 78 of the control transformer secondary winding, so as to effect actuation of the grid control relay 90 to initiate energization of the electrodes 19 and 20 of the welding machine when a predetermined differential in pressure exists between the fluid pressure source 30 and the lower end of the cylinder 26 of the fluid pressure actuating means. By likewise connecting the lower bore portion 104 of the differential pressure relay 99 through a conduit 122 to the upper end of the cylinder 26 of the fluid pressure electrode actuating means, and the upper bore portion 102 thereof through a conduit 124 to the fluid pressure source 30, and providing contact members 99a and 99b, operatively connected with the piston 106 thereof, the operating winding 126 of an auxiliary locking relay 128 may be connected to a suitable direct-current source such as the rectifier circuit 130 which is connected with the alternating-current source 14, and the operating winding 53 of the fluid pressure valve 28 and the operating winding 132 of an auxiliary relay 134 may be connected to the source 14 so as to coordinate actuation of these control relays with the application of fluid pressure to the electrode actuating means.

In order to vary the interval of the "off" period between successive welding operations when "repeat" operations are being performed, a suitable check valve 135 and an associated adjustable by-pass 136 may be provided in connection with the conduit 122 for varying the rate of flow of pressure fluid to the relay 99 from the cylinder 26, thus controlling the duration of the "off" period, as will be hereinafter explained.

A control switch, such as the push button switch 137, may be provided for initiating a sequence of welding operations, and an auxiliary control switch 138 may be connected for shunting the contact members 99b of the differential pressure relay 99 to provide for non-repeat operations of the welding control. In order to prevent accidental termination of a welding operation through opening of the push button switch 137, the contact members 128a of the auxiliary locking relay 128 are connected in shunt relation with the push button switch 137 to provide a shunt holding circuit for the operating winding 53 of the fluid pressure valve 28.

A locking relay 140, having an operating winding 142 connected across the primary winding 12 of the welding transformer 10, may be provided for maintaining an energizing circuit for the operating winding 53 of the fluid pressure valve 28 while the welding transformer 10 is energized. In order to ensure that the energizing circuit for the operating winding 53 of the fluid pressure valve 28 is properly maintained until the welding circuit is energized, a condenser 145 is provided in shunt circuit relation with the operating winding 126 of the auxiliary locking relay 128 so that the energy therefrom may be utilized to maintain the contact members 128a closed momentarily should the contact members 99a of the relay 99 open before the locking relay 140 closes.

In order to prevent the welding current from being applied for too long a period, a protective relay 150 may be provided, having its operating winding 152 connected across the primary winding of the welding transformer 12 so that it will be energized upon closure of the line switch 16. Suitable time delay means 154 may be provided for retarding the operation of the protective relay 150 so as to prevent the opening of the contact members 150a until the lapse of a predetermined interval of time. A control relay 158, which is controlled thereby, is provided for effecting deenergization of the line switch 16 and the control circuit in general. Thus, if for any reason the welding current is maintained for too long a period, the protective relay 150 operates, effecting deenergization of the welding circuit and the control circuit so that the operating winding 53 of the fluid pressure relay 28 is deenergized, reducing the pressure applied to the electrodes 19 and 20.

When the welding system is connected to the source 14, the control relay 158 is energized from the source through the contact members 150a of the protective relay 150, and the control system is then in order for operation. To initiate a single welding operation, the auxiliary control switch 138 and the push button switch 137 are closed, connecting the operating winding 53 of the fluid pressure valve 28 and the operating winding 132 of the auxiliary relay 134 to the source 14 through the circuit; from the source 14, through conductor 73, conductor 160, contact members 158a, push button switch 137, auxiliary control switch 138 or contact members 99b, conductor 161, operating winding 53, operating winding 132, conductor 162, and conductor 74 back to the source. Operation of the fluid pressure valve 28 admits fluid pressure to the lower end of the cylinder 26 of the electrode actuating means through the inlet chamber 32, valve member 49, chamber 38, and conduit 42 to the lower side of the piston 24, causing the electrode 20 to be moved into engagement with the work 22. At the same time, the upper end of the cylinder 26 is connected to the atmosphere through conduit 40, chamber 36, valve member 47 and chamber 44.

The operating winding 132 of the auxiliary relay 134 being also energized, contact members 134a close to connect the operating winding 126 of the auxiliary locking relay 128 to the source of direct current 130, through conductor 164, contact members 140b of the locking relay 140, contact members 99a, conductor 165, contact members 134a of the auxiliary relay 134, operating winding 126, and conductor 167 back to the source 130. Closure of the auxiliary locking relay contact members 128a provides a holding circuit about the pushbutton switch 137, thus ensuring an energizing circuit for the operating winding 53 of the fluid pressure valve 28 and the operating winding 132 of the auxiliary relay 134 until the locking relay 140 closes. The condenser 145 is connected across the operating winding 126 of the auxiliary locking relay 128 through contact members 134a to ensure a momentary energizing circuit therefor, should the pushbutton switch 137 be accidentally opened before the locking relay 140 closes.

The reduction in fluid pressure at the upper end of the cylinder 26 also reduces the fluid pressure applied to the lower bore 104 of the differential pressure relay 99 so that the relay 99 returns to the deenergized position and contact members 99a and 99b open when a predetermined pressure differential between the upper and lower cylinder bores thereof is attained. Likewise, the application of fluid pressure to the lower end of the cylinder 26 increases the fluid pressure applied to the lower bore 104 of the relay 100 and effects operation thereof when the pressure differential between the source 30 and the lower end of the cylinder 26 reaches a predetermined minimum value, closing contact members 100a.

Closure of contact members 100a connects the operating winding 98 of the grid control relay 90 across the control transformer winding 78, effecting operation of the grid control relay 90 to connect the grid 81 of the gaseous discharge device 82 across the positively charged condenser 83 through contact members 90a. The gaseous discharge device 82 is rendered conductive, energizing the operating winding 64 of the auxiliary switch 66 so that the auxiliary switch operates to connect the operating winding 79 of the line switch 16 to the source through contact members 66a and 158b. A shunt holding circuit for the operating winding 98 of the grid control relay 90 is provided by the closure of contact members 66b.

Closure of the line switch 16 connects the primary winding 12 of the welding transformer to the source 14, energizing the electrodes 19 and 20. This energizes the locking relay 140, thus providing an energizing circuit for the operating winding 53 of the fluid pressure valve 28 during the welding period by providing a shunt holding circuit about the push button switch 137 from conductor 73 through conductor 160 contact members 158a, contact members 140c, conductor 161, windings 53 and 132, conductor 162, back to conductor 74. Contact members 140b of the locking relay 140 open, disconnecting the auxiliary locking relay 128 from the direct-current source 130, and contact members 140a close to ensure discharge of the condenser 145.

The duration of closure of the line switch 16 may be determined by the rate of discharge of the condenser 83 which applies the positive bias potential to the grid 81 of the gaseous discharge device 82. By varying the setting of the variable discharge resistor 94, this time may be controlled over a wide range. When the bias potential falls below a predetermined level, the discharge device 82 ceases to conduct, and the operating winding 64 of the auxiliary switch 66 is deenergized. Contact members 66a open, deenergizing the operating winding 79 of the line switch 16, which opens and disconnects the welding electrodes 19 and 20 from the source 14. The locking relay 140, which is connected across the primary winding of the transformer 18 is then deenergized.

If the pushbutton switch 137 is held closed, the welding sequence cannot be repeated for the energizing circuit for the operating winding 53 of the relay 28 is maintained through push button switch 137 and the auxiliary control switch 138, so that the fluid pressure valve 28 remains in the energized position, fluid pressure is still applied to hold the electrodes 19 and 20 in engagement, and the contact members 100a remain closed, thus maintaining the grid control relay 90 in the energized position. Since the condenser 83 has been discharged and is disconnected from the transformer winding 88 by the open contact members 90c of the grid control relay 90, the gaseous discharge device 82 must remain nonconductive, and the welding operation cannot be repeated.

If, however, the pushbutton switch 137 has been released, the opening of the contact members 140c of the locking relay 140, upon the deenergization of the welding circuit, interrupts the holding circuit for the operating windings 132 and 53 of the auxiliary relay 128 and the fluid pressure valve 28, respectively, and they will be deenergized. The contact members 100a of the relay 100 then open when the differential in fluid pressure between the source 30 and the lower end of the cylinder 26 reaches a predetermined value, interrupting the holding circuit for the grid control relay 90 so that the condenser 83 may be connected through contact members 90c for recharging. The differential pressure relay 99 is actuated to the operative position when the application of fluid pressure to the cylinder 26 to separate the electrodes 19 and 20 reduces the differential in pressures between the source and the upper end of the cylinder 26 to a predetermined value. As soon as the differential pressure relay 99 reaches the operative position and contact members 99a and 99b are closed, the welding sequence may be repeated as hereinbefore described, upon subsequent closure of the pushbutton switch 137.

In order to effect "repeat" operations of the welding apparatus, the auxiliary control switch 138 is opened and the pushbutton switch 137 held closed. Operation of the system will then be substantially the same as hereinabove described, up to and including the energization of the welding electrodes. When the welding current ceases to flow, as determined by the timing means 60, the locking relay 140 opens. The control switch 138 being open, the auxiliary locking relay 128 being disconnected from the source 130 by the opening of contact members 140b when the welding circuit was energized, and the contact members 99b of the differential pressure relay 99 having opened when the fluid pressure valve 28 was energized to apply pressure to the electrode 20, the opening of contact members 140c interrupts the energizing circuit of the auxiliary relay 134 and the fluid pressure valve 28. Upon the deenergization of the operating winding 53 of the fluid pressure valve 28, the valve returns to the deenergized position and the fluid pressure applied to the cylinder 26 is reversed to effect separation of the electrodes 19 and 20. The relay 100 returns to the deenergized position, opening contact members 100a to effect deenergization of the grid control relay 90 so that the condenser 83 is connected through contact members 90c to the transformer winding for charging. The differential pressure relay 99 operates to close contact members 99a and 99b, when the pressure differential between the upper end of the cylinder 26 and the source is reduced to a predetermined value, again providing an energizing circuit for the operating windings of the auxiliary relay 134 and the fluid pressure relay 28, respectively, from the source 14, through conductor 73, conductor 160, contact members 158a, pushbutton switch 137, contact members 99b, conductor 161, operating windings 53 and 132, and conductor 162, back to the source. The sequence of welding operations will then continue to repeat as long as the pushbutton switch 137 is held closed.

From the above description, taken in connection with the accompanying drawing, it may be seen that I have provided a fluid pressure operated control system for spot or seam welding apparatus that is simple and effective in its operation, and is economical to build and maintain. By utilizing differential fluid pressure relays of the type therein indicated, which are of simple construction and are efficient and durable in operation, the sequence of the energization of the welding electrodes and the application of electrode pressure thereto may readily be controlled, and the duration of the welding operations timed as desired. It will be understood, however, that while my invention has been described particularly in connection with the fluid pressure operated welding apparatus shown, it is not limited to such application, and may readily be utilized in connection with welding apparatus of other forms.

Since certain changes may be made in the above construction, and different embodiments of the invention may be made without departing from the spirit thereof, it is intended that everything contained in the above description, or shown in the accompanying drawing, shall be considered as illustrative and not in a limiting sense.

I claim as my invention:

1. The combination with a welding system comprising relatively movable electrode members, fluid pressure actuating means for effecting relative movement of the electrode members, valve means controlling the fluid pressure actuating means, a source of welding current, switch means operable to connect the electrode members to the source, and control means for effecting operation of the switch means for a predetermined period, of time delay means responsive to operation of the switch means for greater than the predetermined period to render the switch means inoperative, fluid pressure relay means responsive to predetermined differentials of fluid pressure between different points in the fluid pressure system for initiating the operation of the control means and controlling the operation of the valve means in a predetermined sequence in response to the fluid pressure conditions at the source and the actuating means.

2. The combination with a welding system comprising relatively movable electrode members, a source of welding current, switch means for connecting the electrode members to the source, control means for effecting timed operations of the switch means, fluid pressure actuating means for effecting relative movement of the electrode members, a fluid pressure system for supplying fluid pressure to the fluid pressure actuating means, and valve means operable to apply fluid pressure to the actuating means, of relay means responsive to differences of fluid pressure in the fluid pressure system between the actuating means and the fluid pressure supply for initiating operation of the control means to connect the electrode members to the source in a predetermined sequence relative to application of fluid pressure to the actuating means, means responsive to the connection of the electrode members to the source for maintaining the valve means in the operated position, and additional relay means responsive to differences of fluid pressure between the actuating means and the fluid pressure supply for controlling the operation of the valve means.

3. The combination with a welding system comprising relatively movable electrode members, switch means operable to control the energization of the electrode members from a source of welding current, fluid pressure actuating means for effecting relative movement of the electrode members, and valve means for connecting the fluid pressure means to a source of fluid pressure, of timing means for effecting a single timed operation of the switch means, relay means responsive to predetermined fluid pressure conditions at the actuating means and the source of fluid pressure for initiating the operation of the timing means in a definite sequence relative to the operation of the electrode members, and relay means responsive to the energization of the electrode members for preventing operation of the valve means to disconnect the fluid pressure means from the source while the electrode members are energized.

4. A control system for welding apparatus having a pair of relatively movable electrode members, switch means for controlling the energization of the electrode members from a source of welding current, fluid pressure actuating means for effecting relative movement of the electrode members, fluid pressure valve means operable to control the application of fluid pressure to the electrode actuating means from a source of fluid pressure, comprising means for initiating operation of said valve means, fluid pressure differential relay means for controlling the operation of said valve means, timing means for controlling the operation of the switch means, additional fluid pressure differential relay means for initiating operation of the timing means, relay means operable from a direct current source to ensure energization of the fluid pressure valve means, condenser means associated with the relay means for momentarily ensuring energization thereof, and additional relay means operable to maintain an energizing circuit for maintaining the valve means in the operated position during a welding operation, said fluid pressure differential relay means being responsive to predetermined differences in fluid pressure in the fluid pressure system to coordinate the energization and deenergization of the electrode members with predetermined conditions of electrode pressure.

5. The combination with a welding system having a pair of relatively movable electrode members, a fluid pressure actuating means for effecting relative movement of the electrode members, switch means for effecting energization of the electrode members from a source of welding current, and a fluid pressure valve for controlling the application of fluid pressure to the actuating means, of means for initiating a welding sequence by effecting actuation of the fluid pressure valve, relay means operable to provide a holding circuit for the fluid pressure valve, means responsive to the energization of the electrode members for maintaining the fluid pressure valve in the actuated position, condenser means associated with the relay means for momentarily maintaining the relay means in the energized position, and fluid pressure means responsive to differences in fluid pressure between the actuating means and the source of fluid pressure for controlling the operation of the switch means in accordance with predetermined conditions of electrode pressure.

6. A sequence control system for apparatus having relatively movable work engaging members, switch means for controlling the energization of the work engaging members from a source of current, fluid pressure actuating means for effecting relative movement of the work engaging members, and valve means operable to connect the actuating means to a source of fluid pressure comprising, timing means for effecting a single timed operation of the switch means, fluid pressure relay means responsive to predetermined differences in fluid pressure between the actuating means and the source for controlling the operation of the valve means to connect the actuating means to the source of fluid pressure and initiation of the timing means, switch means for initiating operation of the valve means, auxiliary control means including a relay having an operating winding and a condenser connected thereto to provide for maintaining the valve in the operated position, and manually operable switch means prepositioned to control the operation of the valve means for selectively effecting either a single or repeated welding operation.

7. A control system for apparatus having relatively movable work engaging members, fluid pressure actuating means operatively connected with the work engaging members, and electro-responsive valve means for connecting the actuating means to a source of fluid pressure comprising, means for connecting the work engaging members to a source of current, timing means for controlling the operation of said means, fluid pressure relay means responsive to predetermined fluid pressure conditions at the actuating means and the source of fluid pressure for controlling the valve means and the timing means, and relay means responsive to the energization of the work engaging members for preventing operation of the valve means to disconnect the actuating means from the source of fluid pressure while the work engaging members are energized.

8. The combination with apparatus having relatively movable work engaging members, fluid pressure actuating means for effecting relative movement of the work engaging members, and valve means operable to connect the actuating means to a source of fluid pressure, of control means comprising, means effecting the energization of the work-engaging members from a source of current, a timing circuit for effecting a single timed operation of the said means, switch means differentially responsive to fluid pressure conditions at the actuating means and at the source of fluid pressure for initiating the energization of the timing circuit, control means responsive to the energization of the work-engaging members for maintaining the valve means in the operated position, and differentially responsive fluid pressure relay means controlling the operation of the valve means to prevent a subsequent operation of the actuating means for a predetermined interval of time.

9. A sequence control system for apparatus having fluid pressure actuating means, an associated work circuit and valve means for connecting the actuating means to a source of fluid pressure comprising, switch means operable to effect the energization of the work circuit from a source of current, timing means for effecting a single timed operation of the said switch means, fluid pressure relay means for initiating the operation of the timing means in accordance with predetermined relative pressure conditions at the actuating means and the source of fluid pressure, time delay means responsive to the energization of the work circuit for an interval greater than provided by the timing means for rendering said switch means inoperative and additional fluid pressure relay means controlling the operation of the valve means in accordance with predetermined relative pressure conditions at the actuating means and at the source of fluid pressure.

COLBY W. STEWARD.